(12) United States Patent
Gulik

(10) Patent No.: US 12,227,934 B1
(45) Date of Patent: Feb. 18, 2025

(54) TORNADO SAFE HOUSE AND GARAGE IN PYRAMID FRUSTUM SHAPE

(71) Applicant: Ryszard Gulik, Palm Bay, FL (US)

(72) Inventor: Ryszard Gulik, Palm Bay, FL (US)

( * ) Notice: Subject to any disclaimer, the term of this patent is extended or adjusted under 35 U.S.C. 154(b) by 66 days.

(21) Appl. No.: 18/499,793

(22) Filed: Nov. 1, 2023

(51) Int. Cl.
| | |
|---|---|
| E04B 1/348 | (2006.01) |
| E04B 1/16 | (2006.01) |
| E04B 1/24 | (2006.01) |
| E04B 1/32 | (2006.01) |
| E04B 1/343 | (2006.01) |
| E04B 5/02 | (2006.01) |
| E04H 1/12 | (2006.01) |
| E04H 9/14 | (2006.01) |

(52) U.S. Cl.
CPC .......... *E04B 1/34823* (2013.01); *E04B 1/161* (2013.01); *E04B 5/023* (2013.01); *E04H 9/14* (2013.01); *E04B 2001/2415* (2013.01); *E04B 2001/3276* (2013.01); *E04B 1/34321* (2013.01); *E04H 1/1205* (2013.01); *Y02A 50/00* (2018.01)

(58) Field of Classification Search
CPC ...... E04B 1/34823; E04B 1/161; E04B 5/023; E04B 2001/2415; E04B 2001/3276; E04B 1/34321; E04H 9/14; E04H 1/1205; Y02A 50/00
See application file for complete search history.

(56) References Cited

U.S. PATENT DOCUMENTS

| | | | | |
|---|---|---|---|---|
| 3,820,292 A | * | 6/1974 | Fitzpatrick | E04B 1/343 |
| | | | | D25/18 |
| 4,071,986 A | * | 2/1978 | Wickwire | E04B 1/32 |
| | | | | D25/18 |
| 4,359,842 A | * | 11/1982 | Hooker | A63H 33/16 |
| | | | | 52/DIG. 10 |
| 4,663,898 A | * | 5/1987 | Yacaboni | E02D 27/42 |
| | | | | D25/19 |
| 5,377,460 A | * | 1/1995 | Hicks | E04B 7/10 |
| | | | | 52/80.1 |
| 5,501,046 A | * | 3/1996 | Hattingh | E04B 1/34321 |
| | | | | 52/270 |
| 5,651,220 A | * | 7/1997 | dit Felix | E04B 1/6116 |
| | | | | 52/285.3 |
| 5,873,206 A | * | 2/1999 | Roberts | E04B 1/3211 |
| | | | | 52/249 |
| 9,255,421 B2 | * | 2/2016 | Gulik | E04H 9/14 |

(Continued)

*Primary Examiner* — Omar F Hijaz

(57) ABSTRACT

The tornado-safe structure comprises a plurality of column-wall pairs set in a concentric pattern symmetrical about both plane axes on the polygonal foundation of the concrete slab with embedded peripheral bracket assemblies securing the position of a multitude of trapezoidal columns and rectangular wall panels, resulting in polygonal frustum shape of the house or garage where columns are always in the shape of isosceles trapezoid and walls are invariably rectangular therefore manipulating angular relative placement between columns and walls on foundation allow to construe the irregular shape of the house where the vertical wall liners inside the house assure the living space with vertical walls and provide utility space between the liners and outside walls, either in one or two-story dwelling with the roof as picnic area which also provides storage for drinking water and installation of solar panels and in a garage a cultivation space.

6 Claims, 10 Drawing Sheets

(56) References Cited

U.S. PATENT DOCUMENTS

| | | | |
|---|---|---|---|
| 2005/0284074 A1* | 12/2005 | Armstrong | E04B 1/14 52/588.1 |
| 2007/0151170 A1* | 7/2007 | Carter | E04B 1/3211 52/81.1 |
| 2012/0204496 A1* | 8/2012 | McSweeney | E04B 1/3211 52/80.1 |
| 2015/0159393 A1* | 6/2015 | Gulik | E04H 9/14 109/1 S |
| 2020/0299951 A1* | 9/2020 | Drew | E04H 9/10 |

* cited by examiner

DETAIL A

SECTION A-A

DETAIL C

ENTRANCE VIEW

ISOMETRIC VIEW

SECTION B-B

SIDE VIEW

TORNADO SAFE HOUSE AND GARAGE IN PYRAMID FRUSTUM SHAPE

CROSS-REFERENCE TO RELATED APPLICATIONS

Not Applicable

STATEMENT REGARDING FEDERALLY SPONSORED RESEARCH AND DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

PRIOR DISCLOSURES BY THE INVENTOR

Not Applicable

BACKGROUND OF THE INVENTION

The least expensive homes in the US that are also most popular in the hurricane corridor are the box-shaped prefabricated houses with large walls that make structures vulnerable to high wind conditions. Those structures, which usually rest on a set of cinderblocks that act as a foundation, are rarely anchored to the ground and leave a space under the floor that allows wind penetration to create lifting force. The large walls, especially facing the wind direction, are exposed to wind force strong enough to cause damage by turning the structure sidewise or displacing the structure from the foundation. Most houses have roofs made from wooden plank rafters supported on inside load-bearing walls. The roofs are the most vulnerable to high wind when not correctly secured to the walls. The shape, quality, and physical condition of a roof are the most common causes of damage. Modular houses manufactured in a factory comply with regulations and building codes and withstand road transportation, but final installation is not strictly regulated or executed. During every hurricane season, prefabricated houses, when installed without anchoring to the ground and with poorly maintained roofs, are susceptible to extensive property damage and loss of human lives comparable with damage recorded for trailer houses. The tendency to use a subfloor space in prefabricated houses for running electrical and often gas installations does not improve the house's safety either.

Foundation in the form of concrete slab permits freedom in architectural design, allowing elaborate shapes of walls followed by roof additions vulnerable to wind force during hurricanes. Any damage to part of the house structure initiates the destruction of other house elements. Safety of the house during a hurricane depends on sustainable design, quality of craft, the resilience of roofing material, strength of the connection between roof and walls, anchoring of the structure to the ground, and also a grade of structure disintegration specific for a type of climate and type of material used in construction. The wood used to construct the roof and inner structural elements is affected by possible termite infestation and fire in dry climates. Installation of roof rafters is associated with the need for costly service of industrial size crane brought to the site. Eliminating wood from the house provides safety for the house residents, prevents damage by fires, ensures the structure's longevity, saves forests, and allows the Use of the house in dangerous conditions of hurricane regions. The lack of inner bearing walls inside the house ensures freedom in adapting floor plans to individually desired functionality.

Concrete buildings based on large-panel construction are expensive and mainly used for multi-apartment houses in the cities but are not practical or popular in rural areas. Individual homes built from prefabricated concrete panels are costly, have architectural limitations in planning living space, and use heavy construction machinery on site in the erection process. Large wall construction as a building system for individual homes in the present environment has a slight advantage over the cinderblock type of wall.

Modular houses in polygonal shapes claim to protect during hurricanes. However, with the structure placed above the ground, without being secured to a firm foundation, a claim of protection against wind shear forces does not play well. In every house polygonally shaped, at least one vertical wall carries the brunt of wind shear force in full. The safety of such a shaped house relies on the strength of that particular wall, as damage to one wall in any building destroys the whole structure. Modular structures have the advantage of independence from the seasonal character of the home-building industry but still hold to the standards of traditional buildings, like incorporating inner bearing walls for supporting roof structures. It is necessary to point out that every house in a polygonal shape creates a challenge to fit standard fixtures and furniture in the provided angular living space.

There is a need for a cost-effective dwelling that is safe and impervious to harsh conditions of earthquakes and hurricanes, including sustenance in the eye of a tornado, with an easily assembled modular structure that eliminates most challenging features of present polygonal houses, able to provide flexible and comfortable living space, and has features that allow a house built in remote areas of any climate to be adapted to function as a self-sufficient dwelling.

BRIEF SUMMARY OF THE INVENTION

The primary object of this invention is to provide the apparatus described here in the preferred embodiment that meets the recognized need for a house in diverse and harsh weather conditions, including regions exposed to hurricanes, tornadoes, and earthquakes. The invention covers the requirements for adopting a structure as a self-sufficient dwelling in remote areas. The structure draws the strength from the gravity forces of an assembled plurality of panels in two shapes, where walls are invariably rectangular, and inserts are isosceles trapezoidal. An even plurality of walls and inserts assembled and secured around the perimeter of the concrete foundation form the shape of a pyramid frustum. The structure size and shape always being symmetrical in both planar axes depend on the dimensions of equal and even multitude of inserts and walls. The foundation slab poured on-site in a polygonal shape has multitudinous peripherally embedded anchors defining the placement of inserts and walls on a floor. The anchors embedded in the foundation with mounted peripheral brackets block the outward lateral movement and prevent vertical displacement of the walls and columns. The concrete foundation and finished structure have a common centroid.

When tilted from a balanced vertical position, a rectangular wall panel becomes unbalanced when the center of gravity forces project outside the wall panel base. The wall falls if not supported by any means. The gravity force that causes the wall to fall grows with an increase in the wall panel's tilt angle. Two vertical wall panels set on a floor at an angle and joined along joint side edges remain in equilibrium as long as both stay in contact.

The two walls set on a floor at an angle with the wall bases placed at a distance from each other are in equilibrium only when the tops of both walls are in contact and reciprocally support each other. Each wall supports the gravity force adherent to the tilt angle of the opposite wall. Increasing the separation distance for the walls at the bottom increases the tilt angle of the walls and places the gravity force farther from the base. Higher gravity force requires stronger support from the opposite wall, which defines connection strength between walls that grows with a tilt angle of a wall from the upright position. The space between the edges of the two tilted and balanced walls has a triangle shape.

The isosceles trapezoidal insert instead of insert in triangular shape acts even better in holding two walls in balance, conforming not only to the tilt angle but also to the separation distance of wall bases. While walls retain their rectangular shape in all constructions, building irregular polygonal shapes of the structure is done by manipulating the dimensions of trapezoidal inserts. The top face of the insert is always shorter than the bottom face. Connection strength between two walls and an insert is equal to a lateral compression force acting on the side edges of an insert and comes from the gravity of neighboring walls. The set of two leaning walls and the insert is always balanced. The structure consisting of a multitude of balanced sets is equally balanced and resistant to outside forces acting inwardly on walls or inserts, where the more significant the force, the stronger the interaction along the side edges between the walls and the insert. Each balanced set can support an additional load placed on top. Insert in trapezoid shape is destined to carry the load. When assembled, the structure of multitudinal balanced sets does not need the fastening between the insert and walls unless to prevent pushing a wall from inside-out, which is unlikely in hurricane conditions.

Acting from the inside out on the balanced set of two walls and an insert defeats the integrity of that set. It causes the insert to collapse toward the centroid of the structure when not supported by compressing forces from leaning walls. Each insert must connect the corresponding insert on the opposite side of the structure to hold the balance of the whole structure with or without the walls. The structural assembly of i-beams, when placed on a fully balanced structure on ledges of the inserts, connects opposite inserts through the reactions from lateral forces of the tilted walls. In a temporary balanced structure, the reaction force equals the gravity force of the inserts leaning towards each other and the lateral force resulting from a vertical load placed on the structural assembly of i-beams that the insert supports, so force acting on any insert on one side counter the reaction force of the corresponding insert on the opposite side of the symmetry plane and is conveyed by the structural assembly of i-beams. The inserts' structure stays temporarily balanced and becomes fully balanced only after all walls fill the space between the inserts. For that purpose, any walls may replace the concrete walls, and the structure still retains characteristics of the balanced pyramid frustum structure as long as the replacement walls tightly conform to the size of the openings created by two neighboring columns. The replacement walls retain functions of the original walls of a structure by providing side support for the columns, and the structure no longer relies solely on reciprocal support from the opposite column connected by the i-beam.

The number of column-wall pairs assembled in a polygonal shape, the tilt angle of the walls, and the length of the trapezoidal column top define the shape of the column. Tilt angles of walls and columns define the living space of the house. The most effective and economical tilt angle of the walls top towards the centroid of the structure is between four and eight degrees based on empirical data.

The size of the column at the bottom is equal to the distance between the bottoms of neighboring walls. The column size at the top depends on the height and the tilt angle of the wall and is always smaller than the column bottom but must be large enough to support the structural i-beams of the roof slab. The shape of the polygon suited for a pyramid frustum structure, apart from being always symmetrical about both plane axes, is controlled by the outside angle between the sides of the column and neighboring walls where the sum of outside angles between all sides of the polygon is equal to 360 degrees. For the regular polygon, the outside angles are all equal. For the irregular polygon, the outside angles varied but had to conform to the rule of the total sum of angles in polygonal geometry and both axes symmetry of the structure.

Column and wall panels have rabetted side edges and are shiplap connected along the adjacent side edges where a column's wider inside face supports the wall's wider outside face. The width difference between the inside and outside faces of the wall panel defines the shiplap whose size is equal for the column and wall. A complete set of columns and walls assembled over the floor slab create a rigid, self-standing, shell-like structure impervious to damage by earthquake tremors. A tremor affecting a tilt angle on one side of the structure increases lateral force between panels and, at the same time, decreases lateral force between panels on the opposite side. The amplitude of the tremor exceeding the tilt distance of the top of the wall from the vertical position overcomes the lateral compressing forces resulting from the gravity force of leaning walls holding together columns and walls in the structure if walls and columns are not secured otherwise. Only then does the wall disengage from the structure and fall in the opposite direction, thus defeating the structure's integrity.

A column for a two-story house provides two types of ledges. The top ledges of column panels support the roof slab, while intermediate ledges support the second-floor slab. Both slabs contain structural i-beams placed on column ledges to support a load of concrete slab with a weight of equipment placed on the slab, which in the disclosed embodiment consists of a layer of corrugated sheet metal decking panels reinforced with steel wire mesh, and for larger structures also with reinforced rods, all encased in high-density concrete. Both floor and roof concrete slabs stabilize and increase the house's rigidity and eliminate a need for additional load-bearing walls inside the living space of the structure. All columns evenly carry a predesigned life load of each rigid slab and a dead weight of the slab. Columns in a trapezoidal shape and walls in a rectangular shape, both with side shiplap, could easily be cast in a factory with reusable forms known for producing structural concrete elements.

The column panel initially carries lateral forces created from the gravity force of the two adjoined walls, where the column functions as a wedge between the walls tilted from a vertical position towards the centroid of the structure. The column also carries the weight and live load from the floor and roof slabs through the ledges supporting the structural i-beams. The critical destructive force of the column is equal to the compressive stress value of the concrete body of the column measured in pounds per square inch before failure or disintegration under applied pressure. Building Code Requirements for Masonry Structures define allowable stresses for walls and slabs and show that the stress value for concrete is significantly higher than for lumber. The walls in the house with concrete columns, in zones that are less prone to natural disasters, can be substituted, e.g., by Structural Insulated Panels well popularized in the construction industry and still preserve the sustainability of the structure in severe weather conditions due to the pyramid frustum shape of the house.

The spreader inserts between the columns substitute concrete walls in an assembly to balance the columns, secure the space for walls in the final assembly, and allow the casting of the roof and floor slabs. The spreader inserts carry the lateral load from compression resulting from the gravity of the leaning columns and roof load forces. With removed spreader inserts, the structure of columns and concrete slabs remain in temporary balance until the walls tightly fill the space between the columns created by spreader inserts, ensuring the complete balance of the structure. Regardless of the type, the walls must withstand the wind-shearing force, although decreased by the wall's tilt.

The house walls may have windows and door openings in any desired combination. A two-story house may have a door on the first floor and a window on the second floor, windows on both floors, windows only on the second or the first floor, or have no openings. A structural box frame consists of four rectangular plates of the same width, which depends on the tilt angle of the wall with the opening. Each box frame with top and bottom plates parallel to the floor allows vertical placement of the window and door in the tilted wall, provides protection against rain and flying debris, and prevents the accumulation of elements. The header plates extend outside the wall, creating eaves, while the bottom plates extend inside the house, forming a parapet or windowsill. The header and sill plates serve as a lateral reinforcement of the wall panel otherwise weakened by the structural void created by the opening in the wall. The two side plates connect the header and windowsill plates, and all four together define the window size. Box frames for door openings contain a header plate, two side plates, and a bottom plate as the threshold.

The house represents a unified structure in a pyramidal frustum shape that deflects the destructive force of lateral wind due to all angled and tilted walls while annihilating the lifting force of a tornado. The external force from wind or tremor applied to the wall or column increases the strength of connections in the structure through the increase of lateral force between the columns and walls, thus improving the integration of the structure. A tremor may damage the house when the house as a unit separates from the base slab, which is unlikely for a structure in the shape of a pyramidal frustum where the lateral and vertical movement of walls and columns is restricted by peripheral brackets, being part of a foundation.

The flat top of the structure, the house's roof, has a peripheral banister acting as a safety barrier and a decorative element. An outer staircase provides ingress to the roof of the one-story house, saving the space inside the house. For the house with a garage, which has a staircase leading to the garage roof, the secure passage between the garage and house roofs functions the same way. For a two-story house with a garage, the secure passage leads to the house's second floor and the house roof by another outer staircase.

The roof in the presented disclosure provides a space for installing solar panels, a central A/C unit and functions as a spacious patio for tenants. The house roof also has a polygonal pergola structure following the shape of the rooftop, is centrally placed, and creates shaded space for tenants using a picnic area. Picnic equipment is safe when tucked under the pergola roof. The pergola walls serve as a bearing structure for the adjustable and foldable set of solar panels. Solar panels mounted on bearing walls of the pergola, when folded and tucked along the walls, form the secure shape of a polygonal pyramid frustum that withstands strong winds of hurricanes and prevents damage to the solar panels.

The roof in the presented disclosure collects rainwater. Also, it allows storing drinking water in multiple interconnected water barrels placed around the perimeter of the roof and destined to hold the amount of water adequate for the size of a household. Barrels contain water from the household's well or a water tank, delivering water periodically to the site. When insulated and topped with surface absorbing solar heat, the water barrels provide hot water for Use in a household and alternatively prevent freezing of stored water. The rainwater barrels used as picnic tables incorporate folding seats to reduce the number of moveable items subjected to the wind force. All barrels are placed permanently on the roof. The roof surface retains precipitation adequate to the house location's region, and stores collected water for household use in the rainwater barrels equipped with water pumps powered by solar energy.

Wall vertical liner panels installed inside the house around the perimeter of the tilted walls transfer the pyramidal shape of the house into a polygonal living space with vertical walls. Modular wall vertical liner panels, custom manufactured off-site, allow fast on-site installation. The spaces between walls and wall vertical liner panels contain insulation, plumbing, electrical, and HVAC systems with convenient access at the floor level, eliminating the need for plenum space over the ceiling used in traditional constructions. Wall vertical liner panels, when necessary, use the space between the outside walls and wall vertical liner panels by incorporating storage units, cabinetry, peripheral seat benches, sets of drawers, and alike to reduce the need for furniture and utilize otherwise inactive living space. The wall vertical liner panels destined for Use in the kitchen incorporate structural members for mounting kitchen cabinetry. The wall vertical liner panels enclose windows and doors with matching openings. The wall vertical liner panels are used as custom-made modular inner wall panels assembled on-site to accommodate individual living styles. All panels made in the factory, when delivered to the site with already attached necessary plumbing or electrical installations, further reduce construction time and ensure a higher quality final product.

The disclosed embodiment of the two-story house in a dodecagonal polygonal shape and the one-story structure of the garage in an octagonal shape that is placed close to the house along one of the polygonal walls with an enclosed house-garage box frame passage typical for all box frame openings in the house. A frame containing a hurricane-grade type of rolling or tilting garage door replaces one of the polygonal walls of the garage. The garage structure with an inner staircase provides ample space for parking a truck, workshop equipment, a storage unit with a converter for solar electricity, laundry equipment, a water heater, and garage tools.

The flat roof of the garage, equipped with a peripheral curb, when covered with a layer of soil, serves as a gardening pod for vegetables or flowers. Solar panels, when mounted on the garage roof on adjustable tilting stands, provide shade for plants. Rainwater collected from the house roof irrigates the plants on the garage roof. Eliminating roofs in traditional gable shapes in hurricane regions lowers the chance of wind destruction and decreases dependence on the climate and electrical grid in remote locations.

The hereby presented structure provides a dwelling for extreme weather conditions, including hurricanes, tornadoes, and earthquakes, that is suitable and prepared for the installation of various known equipment that, when applied to features presented by the invention, creates a self-sufficient house.

BRIEF DESCRIPTION OF THE DRAWINGS

Description of the drawings for the present invention of polygonal house embodiment contains numbering consistent for similar parts, views, and details.

Figure 1:
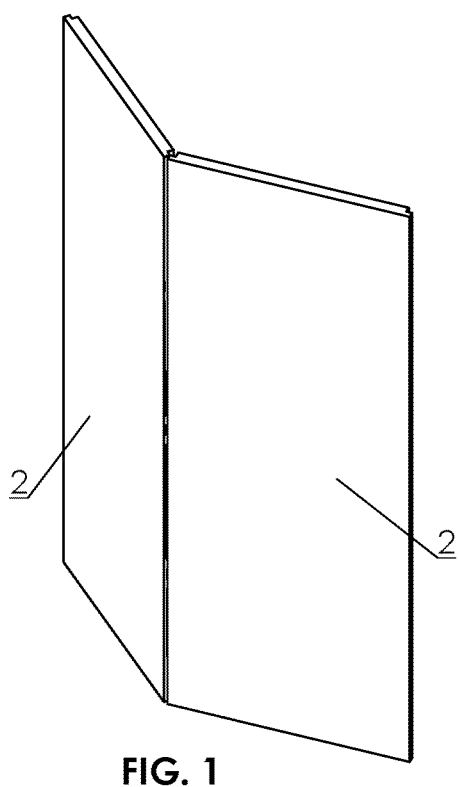
FIG. 1 is a side view of two rectangular vertical walls side-aligned in an angled position to each other.

Drawings of disclosed embodiments illustrate geometrical and structural relation and interaction of the elements to provide the structure's functionality but do not limit dimensional variation of the embodiments except supporting the listed claims. Terminology used in FIGS. 1-27 to describe the embodiment of the invention does not exclude any other wording that adequately describes the construction and function of the present embodiment of the hereby disclosed house and garage invention.

A person with ordinary skills in the art related to the construction of the house can perform calculations for initially set parameters by applying basic geometrical and trigonometrical formulas in the house of a pyramid frustum shape. The resulting house and garage structures prove the ability to function as determined in exemplary disclosures and define the structure as being able to function as a self-sufficient dwelling for Use in remote areas.

LIST OF REFERENCE NUMERALS

Numbers and names are used uniformly throughout for consistency and clarification of terms used in the description. The first numeral designates the part, and decimal numerals and letters differentiate the features of that part. The list also includes items that are not a part of the disclosed invention but are depicted and included only as a functional tool allowing to achieve the desired outcome and to function correctly in the assembly process while containing necessary essential parts.

- 1—Column, 11—2nd-floor ledge, 12—Roof ledge, C1—Width of the first column in octagonal structure, C1$t$—Top face width of the first column, Cd—projected thickness of the column, s—shiplap face, p—perpendicular face in rabbeted connection, α—an outside angle.
- 2—Wall, W1—first wall in the octagon, W8—eight wall in the octagon, Wd—projected width of the wall, Rc—circumscribed radius, Rx—Extension of circumscribed radius.
- 20—Utility space, 20$e$—electric, 20$i$—insulation, 20$p$—plumbing, 20$v$—ventilation,
- 21—Wall vertical liner, 21$a$—drawers, 21$b$—cabinets
- 22—Window box frame, 22$h$—header, 22$j$—jamb, 22$s$—sill,
- 23—Door box frame, 23$h$—header, 23$j$—jamb, 23$t$—threshold,
- 24—Garage-house passage, 24$h$—header, 24$j$—jamb, 24$t$—threshold 25—Garage door opening, 25h—header, 25j—jamb, 25s—sill
26—Garage-house second-floor passage
27—Modular inner walls.
3—House Foundation,
 31—Floor slab,
 32—Peripheral bracket assembly, 32a—anchor, 32b—base, 32c—crown.
4—Second-floor slab,
 41—Structural i-beam,
 42—Decking panels,
 43—Rebar
5—House roof slab,
 51—Structural i-beam,
 52—Decking panels,
 53—Rebar,
 54—Roof peripheral beam, 54a—Roof peripheral curb,
 55—Bracket with banister column,
 56—Covered roof ingress,
 57—Roof peripheral banister,
6—Garage foundation,
 61—Garage floor slab,
 62—Garage column,
 63—Garage wall, 63d—wall with the passage door, 63w—wall with window opening
 64—Garage window,
 65—Garage driveway,
7—Garage roof slab,
 71—Garage roof peripheral curb,
 72—Garage roof ingress,
 73—Garage inner staircase,
 74—Garage roof staircase,
 75—Cultivation space,
 76—Garage-house roof passage.
8—Spreader insert,
 81—Adjustable base,
 82—Shiplap clamp,
 83—Crossbeam.

Parts labeled with numbers and included in recent disclosure are commonly known, and others are required or necessary to make the house self-sufficient and are not detailed or claimed here as an improvement. Those parts are:
 28—Modular inner wall panels,
 72—Garage roof ingress,
 73—Garage inner staircase,
 75—Roof cultivation space.
 91—Picnic tables-barrels collecting rainwater;
 92—Multitude of water barrels for water storage
 93—Pergola structure;
 94—Solar panels;
 95—Picnic equipment placed on a roof.

HOUSE DETAILED DESCRIPTION

Referring to FIG. 1. The two adjacent rectangular walls 2, placed vertically at an angle to each other on the flat surface and aligned along the adjoining edge, are in equilibrium as long as they are not separated at the bottom.

Figure 2:
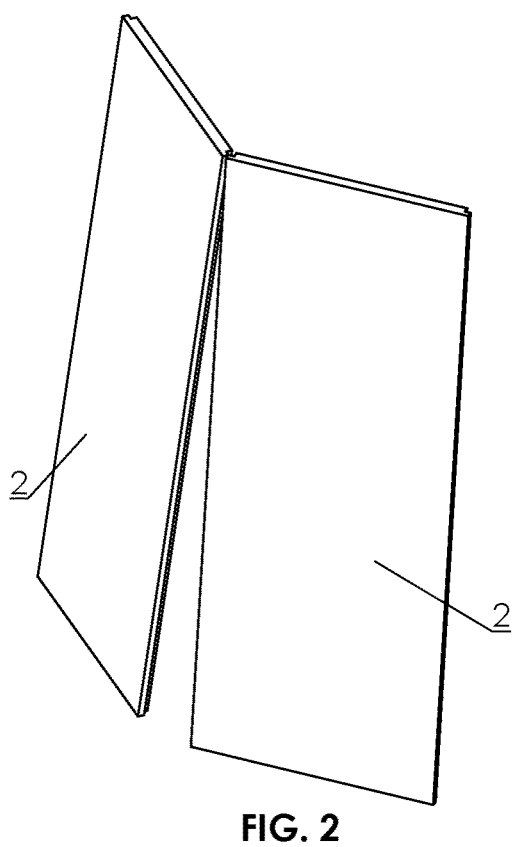
FIG. 2 is a side view of two rectangular walls in angled positions, separated at the bottom and touching at the top.

Referring to FIG. 2. The two adjacent rectangular walls 2, placed at an angle on the flat surface and separated at the bottom, are in equilibrium as long as walls 2 touch each other at the top, providing reciprocal support and preventing the fall of either of the walls 2.

Figure 3:
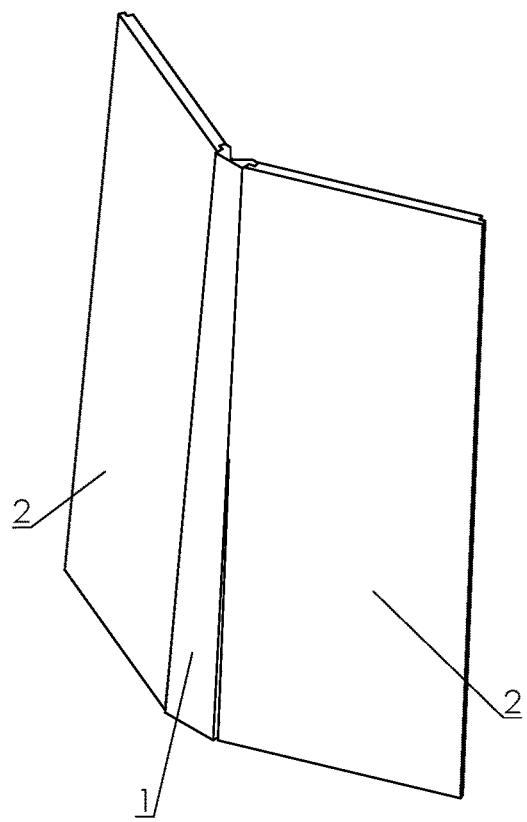
FIG. 3 is a side view of two rectangular walls in an angled position with an isosceles trapezoid-shaped column filling the space between walls.

Referring to FIG. 3. The two adjacent rectangular walls 2 placed at an angle to each other on the flat surface and separated at the bottom are in equilibrium when an insert in the shape of an isosceles trapezoid fills the gap created by the two walls 2 leaning towards each other. Trapezoidal insert balances the lateral force resulting from reciprocal support of the two adjoined walls 2 affected by the gravity force of imbalanced weights of the walls. The size of the lateral force grows proportionally to the sine of the leaning angle of the wall and depends on the weight of the wall. Lateral forces compress the insert, ensuring rigidity and equilibrity of the assembly and allowing the insert to act as a column 1.

Figure 4:
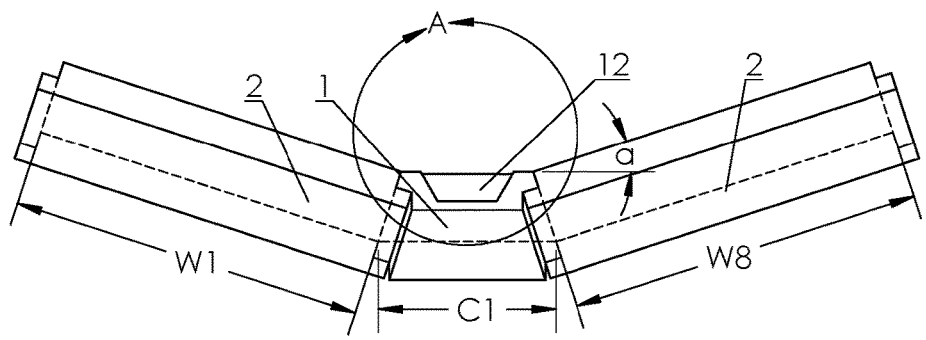
FIG. 4 is a top view of a balanced assembly of a column placed between two tilted wall panels.

FIG. 4 shows the top view of the stable assembly of two walls 2, which are set for octagonal structure at an angle α to column 1 enclosed by two walls 2 W1 and W8. W1 denotes the width of the first wall of the polygon; W8 denotes the width of the polygon's eighth wall, and C1 refers to the width of the first column in the polygon where dashed lines depict all widths and refer to the inner dimensions of the structure, therefore all inner vertices of the structure align.

Figure 5:
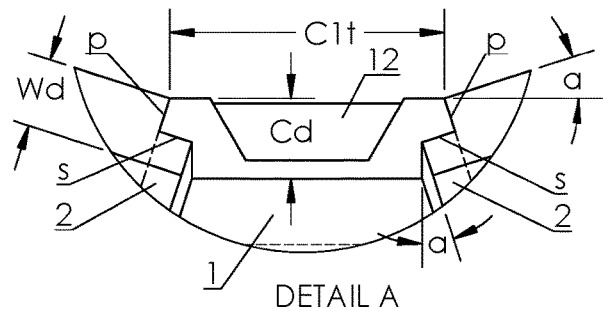
FIG. 5 is a top view of detail A of the column and two adjacent walls.

Referring to FIG. 5. Detail A from FIG. 4 shows the relation of the side edge joint between wall 2 and column 1. The difference in widths measured parallel to the inner and outer faces of the wall panel defines rabbet size that is the same for column and wall and allows using a shiplap connection between wall and column. The shiplap faces s of the side edge of wall 2 correspond with the shiplap faces s of the side edge of column 1 and prevent the inward fall of the wall. Face b of the column edge, perpendicular to the shiplap faces, bears the lateral force from the gravity of the leaning-in wall panel 2. The leaning angle from a vertical position of the wall affects the projection of column Cd and wall thickness Wd projecting on the floor where the faces of the column and wall top and bottom always remain parallel. The angle between the outside faces of the column and the wall equals an outside angle α between the angular position of the wall and column.

The projection of the wall thickness on the floor illustrated in FIG. 5 grows with the increase of the leaning angle from the vertical position. The overall thickness Cd of the column depends on an angle α between column 1 and wall 2, where a larger angle α results in the thicker outside part of the column not interlocked with the wall and, like for the wall, also grows with the column's leaning angle from the vertical position. The top face width C1t of column 1 with the top ledge 12 provides the structural and dimensional support for the assembly of structural i-beams of the roof. When the spreader inserts replace the walls during the house assembly, the lateral forces resulting from the wall's gravity do not exist. Instead, the lateral forces resulting from the gravity of columns act on spreader inserts. Walls tightly fitted in the space between the neighboring columns in the final assembly replace spreader inserts and maintain the dimensional rigidity of the structure. Shiplap faces s of columns support the forces resulting from the gravity of the leaning walls. Walls, when placed between the columns, do not exert any compression on columns set in already fixed positions, except providing rigidity of the whole structure by tightly filling the spaces between the columns.

Figure 6:
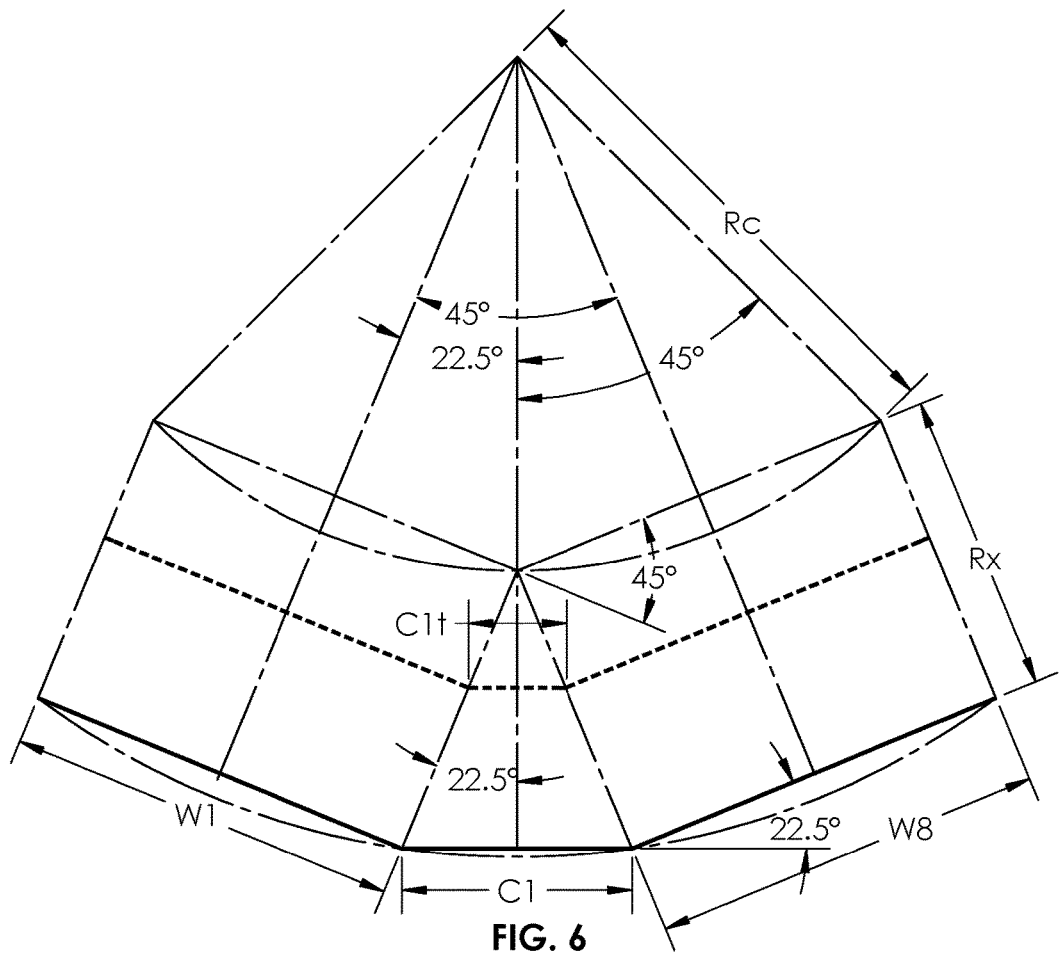
FIG. 6 is a geometrical dependency of column walls set in an octagonal structure.

Referring to FIG. 6. The size of the walls from W1 to W8 defines the circumscribed radius Rc of the circle for an exemplary regular octagon. To fit eight columns between walls without changing the width of the walls, the radius Rc has to be extended by a value of Rx. The offset distance of the top faces of walls 2 and column 1, shown in thick dashed lines, is related to the initially set values of height and leaning angle of walls for the structure. If the resultant width C1t of column top does not provide enough space for the required size of the top ledge 12, the width C1 of column at the bottom has to be increased, causing the change in the overall geometry of the polygon.

Assigning numerical values to parts in FIG. 6 allows calculating the geometry of the polygonal shape of the floor base of the structure, always with an equal number of walls and columns placed in a shape symmetrical to both axes. The widths and leaning angle, uniform for all the walls and all the columns in the regular polygonal shape of the structure, define the inner space of the structure. In irregular, more squarish types of polygonal shapes of houses, the dimensions of the columns vary depending on the size of the outside angles between uniform walls and each particular column. Outside angles between walls and columns in every polygon are calculated by adding the sum of exterior angles of a polygon that equals 360 degrees. The irregular shape of the polygon is achieved by manipulating the values of the outside angles of the columns only. The dimensions of the walls stay unchanged, including the size of the shiplap. The even number of rectangular walls and isosceles trapezoidal column pairs always have to provide the house structure symmetrical in both planar axes, so the sum of outside angles between column and walls in each quadrant of the structure equals 90 degrees. The width of the column's top face decreases when the exterior angle between the wall and the column changes to become more acute. The regular octagonal structure consists of eight rectangular walls of equal size and eight identical columns in isosceles trapezoidal shape. An exterior angle between columns and walls is derived by dividing 360 degrees by 16 sides of the base in a polygonal shape based on a circumscribed circle. Hence, an angle $\alpha$ between each wall and a column equals 22.5 degrees.

Figure 7:
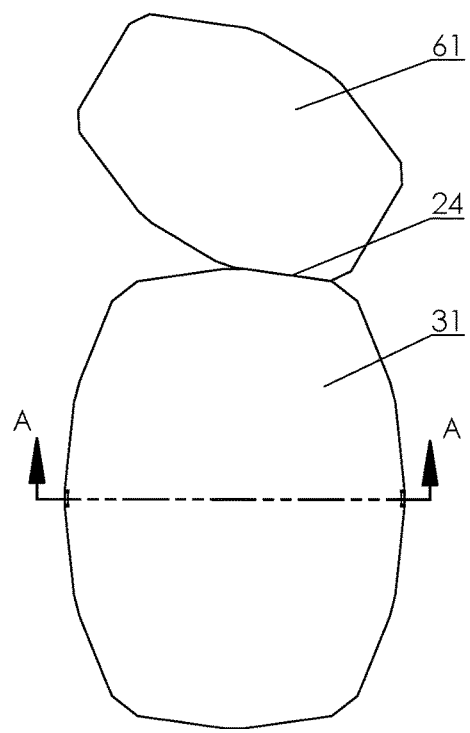
FIG. 7 is a top view of the floor slabs for the decagonal house and octagonal garage, both in elongated shapes.

Referring to FIG. 7. The top view of the house floor slab 31 in dodecagonal shape and garage floor slab 61 in octagonal shape, both irregular polygons, are aligned by the location of an opening 24 for the house-garage passage and indicate cross-section A-A.

Figure 8:
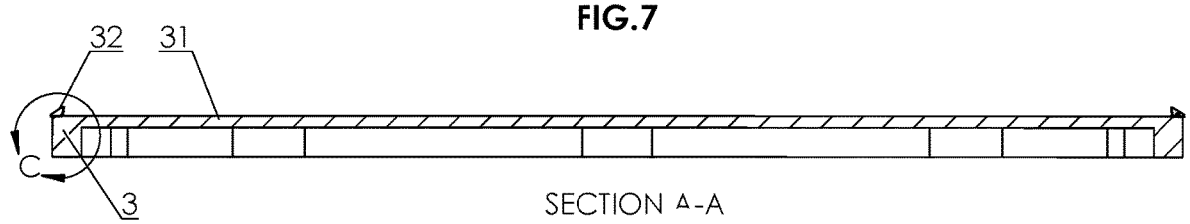
FIG. 8 is a cross-section of the house foundation with a floor slab.

Referring to FIG. 8. The cross-section A-A illustrates the house foundation in the exemplary shape of a dodecagonal elongated polygon. Both foundations for house and garage are the same type and consist of floor slab 31 cast over foundation 3 with an embedded multitude of exemplary peripheral bracket assemblies 32 multiplied by the number of column-wall pairs where there are two bracket assemblies 32 for each wall and one for each column.

Figure 9:
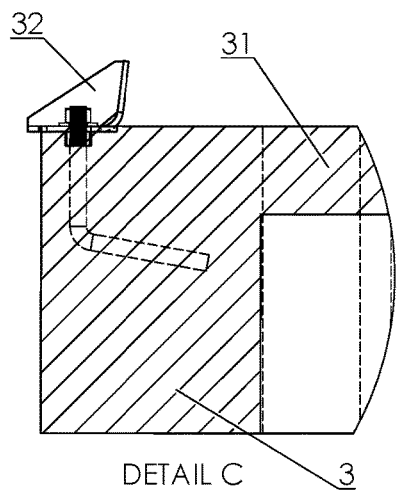
FIG. 9 is a detail C of the foundation with embedded peripheral bracket assembly.

Referring to FIG. 9. Detail C of cross-section A-A shows exemplary foundation 3 and concrete floor slab 31. The exemplary peripheral bracket assembly 32, embedded in the foundation 3, features bent anchors, which provide a grip for the bracket's assembly 32 better than straight anchors.

Figure 10:
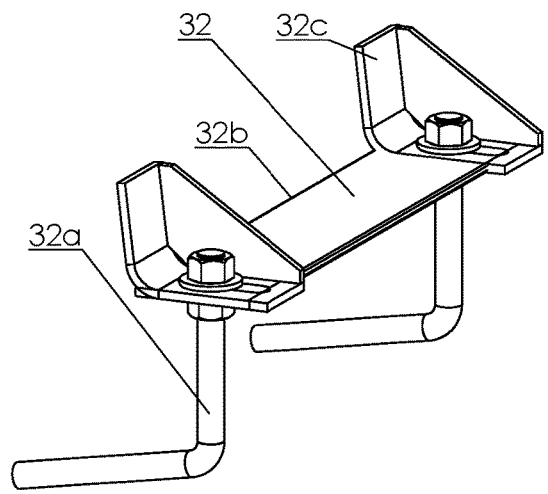
FIG. 10 is an isometric view of the peripheral bracket assembly.

Referring to FIG. 10. Isometric view of the exemplary peripheral bracket assembly 32 illustrates the location of the elements in the assembly where 32a is a bent anchor with a threaded end for retaining crown 32c that slides over base 32b to allow adjustment of the distance of the wall or the column from the centroid of the foundation. The inclined outer face of the crown 32c matches the inclination of the wall or column. Each set of the peripheral bracket assembly 32 controls the lateral and vertical movement of wall 2 or column 1 for which it is destined.

Figure 11:
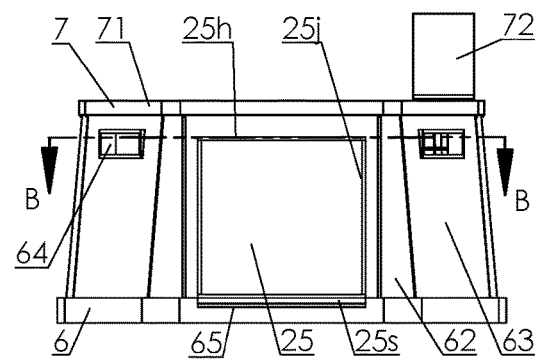
FIG. 11 is an entrance view of the garage in an elongated shape.
Figure 12:
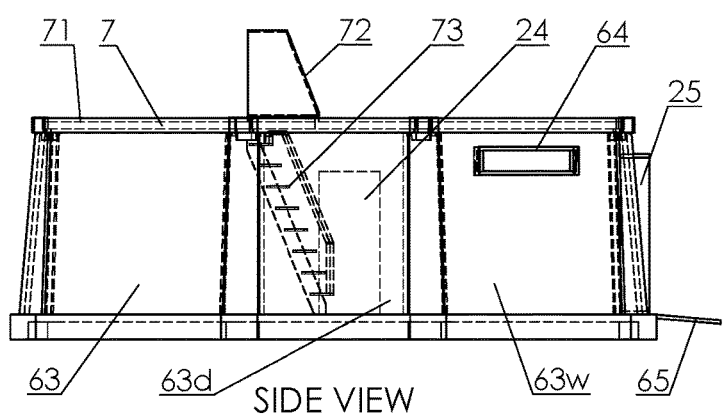
FIG. 12 is a side view of the garage in an elongated shape with roof ingress and inner stairs.

Referring to FIGS. 11 and 12. FIG. 11 depicts the entrance view of the garage with garage door 25 having the step 25s, the jamb 25j, and the header 25h, while FIG. 12 shows driveway slab 65 in the garage side view with visible, hidden lines. Garage columns 62 with walls 63 placed on garage floor slab 61 form the overall shape of the garage. Garage roof slab 7 has a peripheral curb 71, of which height depends on the designation of the roof, with shorter for rainwater collection and taller when the roof is used for agricultural cultivation. Covered ingress 72 protects stairs 73 leading to the garage roof. The wall 63d has an opening to accommodate house-garage passage assembly 24, while wall 63w has a window opening 64.

Figure 13:
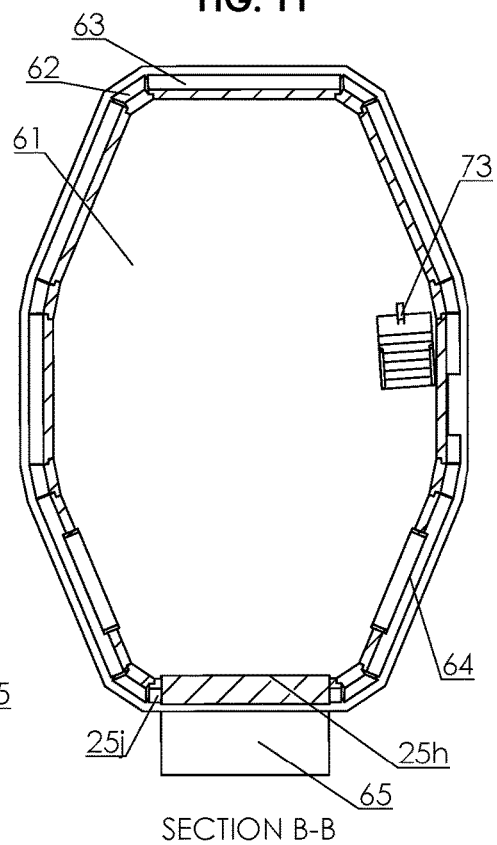
FIG. 13 is a top view of the cross-section B-B of the garage in an elongated shape.

Referring to FIG. 13 detailing section B-B of the entrance view. Stair 73 placed by the opening of the house garage passage, functions as an internal staircase for communication between the ground floor of the house and both roofs of the garage and the one-story house. The space inside the garage is big enough to accommodate the placement of a solar converter and energy storage unit, utility room with water boiler, laundry set of washer-dryer, and garage tools.

Figure 14:
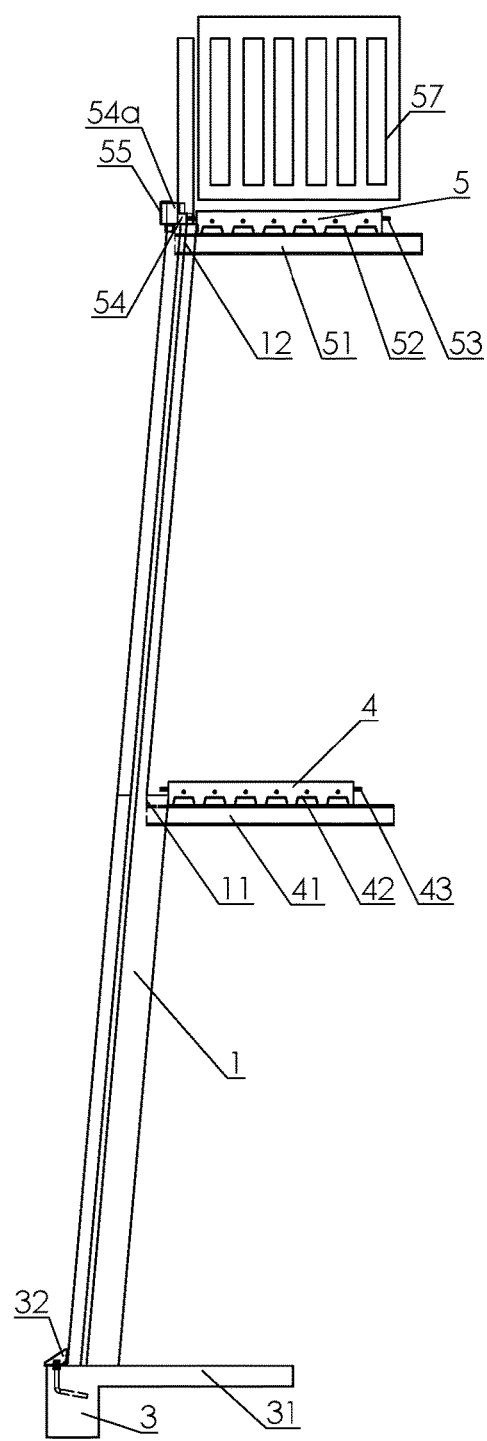
FIG. 14 is a schematic side view of the column placed on a foundation showing an exemplary cross-sectional view of the second floor and roof slabs.

Referring to FIG. 14. The schematic side view of column 1 for a two-story house placed on foundation 3 shows an exemplary cross-sectional view of the second floor and roof slabs. Decking panels with rebars or steel mesh, whose sizes depend on the required strength of the slab, when placed on structural i-beams, fill the space of the concrete slab cast on-site in the shape defined by the inner faces of assembled column-wall pairs. On the second floor, the structural i-beam 41 rests on a second-floor ledge 11 supporting decking panels 42 and concrete slab 4 with embedded rebars 43. At the roof, the structural i-beam 51 rests on roof ledge 12 supporting decking panels 52 and concrete slab 5 with embedded rebars 53. The brackets with banister column 55 placed on top of the column establish positions of the roof peripheral beams 54, which act as the outside edge of the roof concrete slab 5, and allow installation of the roof peripheral banister 57 between brackets with banister column 55.

Figure 15:
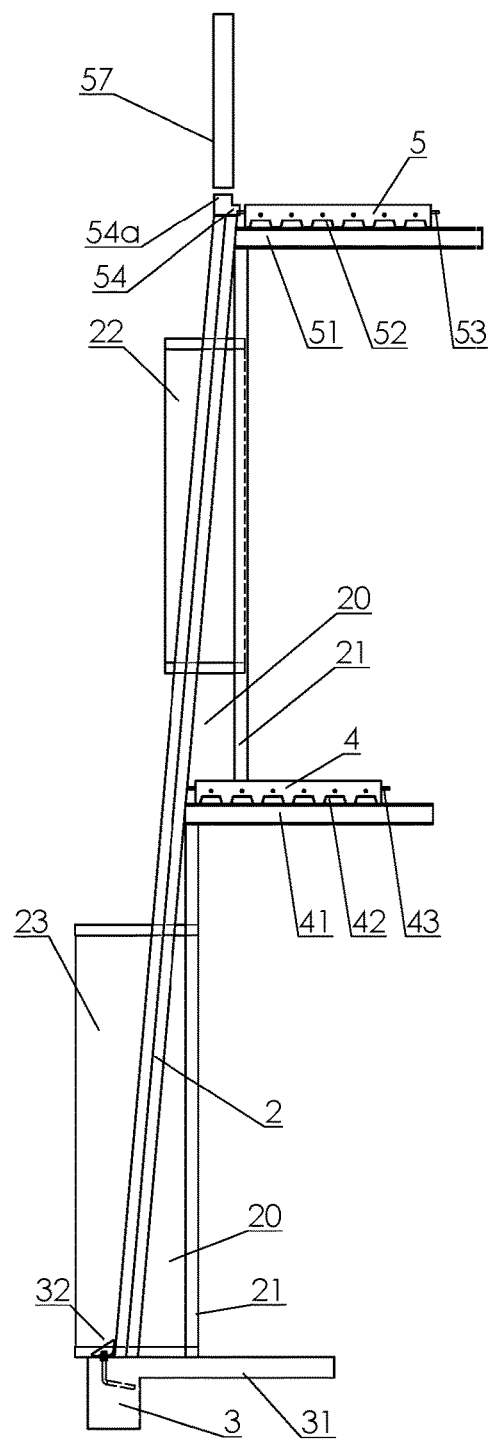
FIG. 15 is a schematic side view of the wall with the wall vertical liners, entrance door, and window frames showing an exemplary cross-sectional view of the second floor and roof slabs.

Referring to FIG. 15. The schematic side view of wall 2 for a two-story house placed on foundation 3 shows an exemplary cross-sectional view of the second floor and roof slabs that are supported respectively only on ledges 11 and 12 of column 1, where the inner faces of walls 2 and the roof peripheral beams 54 at roof level define the shape of the cast on-site concrete house roof slab 5 and second-floor slab 4. The overall height of the peripheral beam 54 depends on the roof designation for which the beams 54 are used, with higher roof peripheral curb 54a for rainwater collection. Window box frame 22 mounted on the second floor protects against elements where header 22h functions similarly to the eave of the traditional roof and sill 22s works inside the house as a parapet. The header 23h with jamb 23j of the door box frame 23 works as a hood for the entrance door, and together with threshold 23t establishes a finite opening for the entrance door. Box frames allow mounting windows and doors vertically in leaning walls, having headers and sills always parallel to the floor and the widths dependent on the height of the insert and the tilt angle of the wall.

Figure 16:
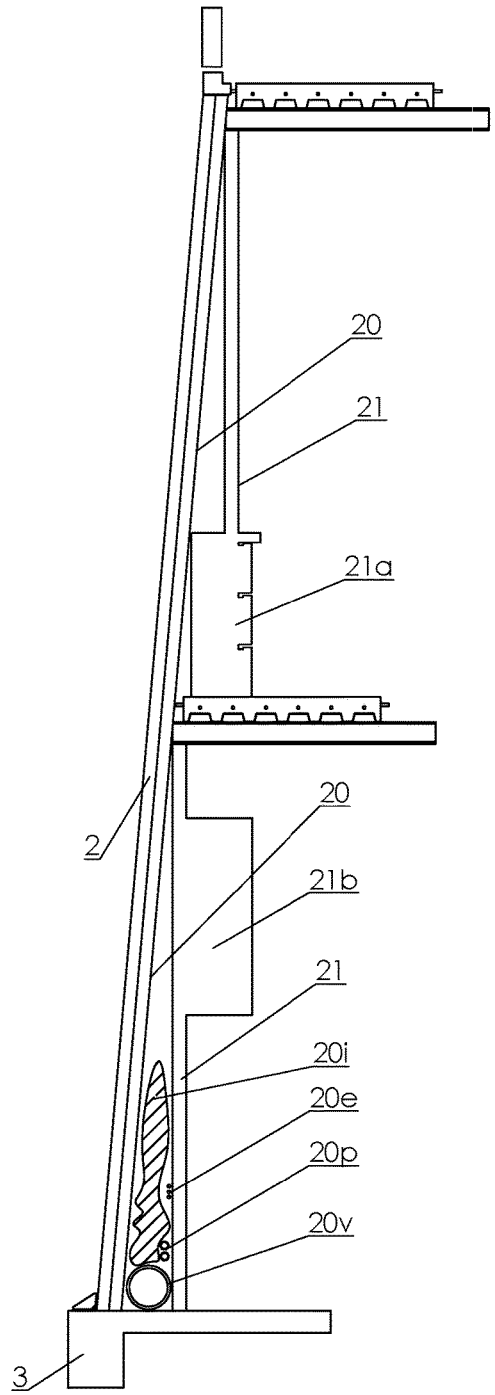
FIG. 16 is a schematic side view of the wall showing exemplary utilization of wall vertical liners inside the house structure.

Referring to FIG. 16. The schematic side view of wall 2 for the two-story house placed on foundation 3 shows an exemplary cross-sectional view of utility space 20 between outside walls 2 and wall vertical liners 21 that on the ground floor enclose insulation 20i, plumbing 20p, electrical 20e, and ventilation 20v systems. Use of the utility space 20 in the described manner provides convenient access from the floor level and eliminates the need for drop ceilings and plenum space used in traditional installations. Although wall vertical liners 21 are not structural members, they can be adapted to function as a part of the furnishing of the house where vertical liners in the kitchen provide the support for hanging kitchen cabinetry 21b or in the bedroom accommodate the installation of the drawers 21a. All installations incorporating vertical wall liners at least partially occupy utility space 20 between the outside tilted walls 2 and the vertical wall liners 21, expanding the living area inside the house and providing the thermal and sound barrier for the house walls. The openings in the vertical wall liners 21 fit the sizes of box frames of windows and doors, making the size of the floor equal to the size of the ceiling and thus providing the living space with vertical walls. All vertical wall liners 21 with equipment installed in a factory further reduce construction time and ensure higher quality workmanship.

Figure 17:
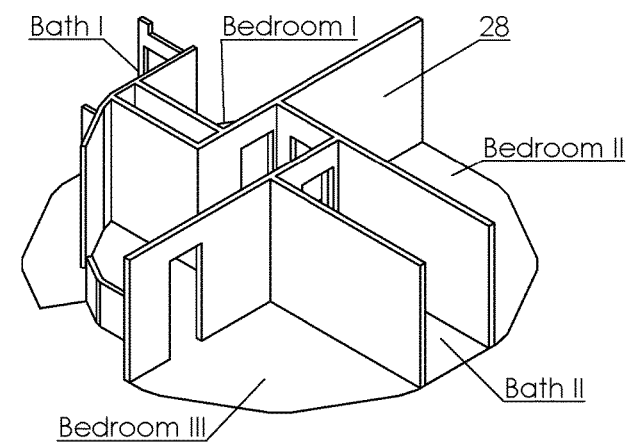
FIG. 17 is an isometric view of the modular inner walls used to customize the living area inside the house.

Referring to FIG. 17. An isometric view of the house's second-floor slab presents a sample of the living space possible configurations of three bedrooms and two bathrooms. If used, a multitude of modular inner walls 28, made in a factory and assembled on-site similarly to vertical wall liners, simplify and accelerate the construction of the house on site. The modular inner walls 28 do not carry any live load and act as space dividers only. The inner walls 28 may be prewired in a factory or delivered with installed features and finishes like, e.g., ceramic tiles or shower head for a bathroom.

Figure 18:
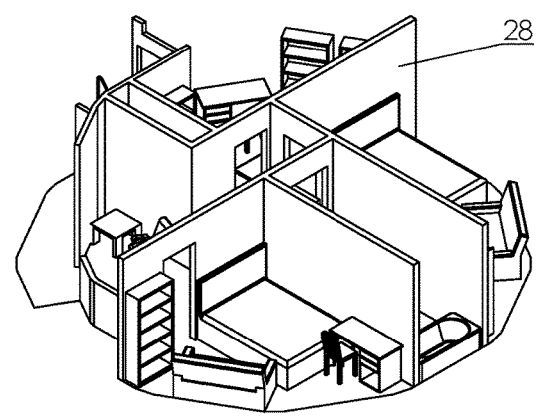
FIG. 18 is an isometric view of the furnished floor of the house.

Referring to FIG. 18. An isometric view of the living space presented in FIG. 17 is furnished accordingly with models true to the size of the rooms.

Figure 19:
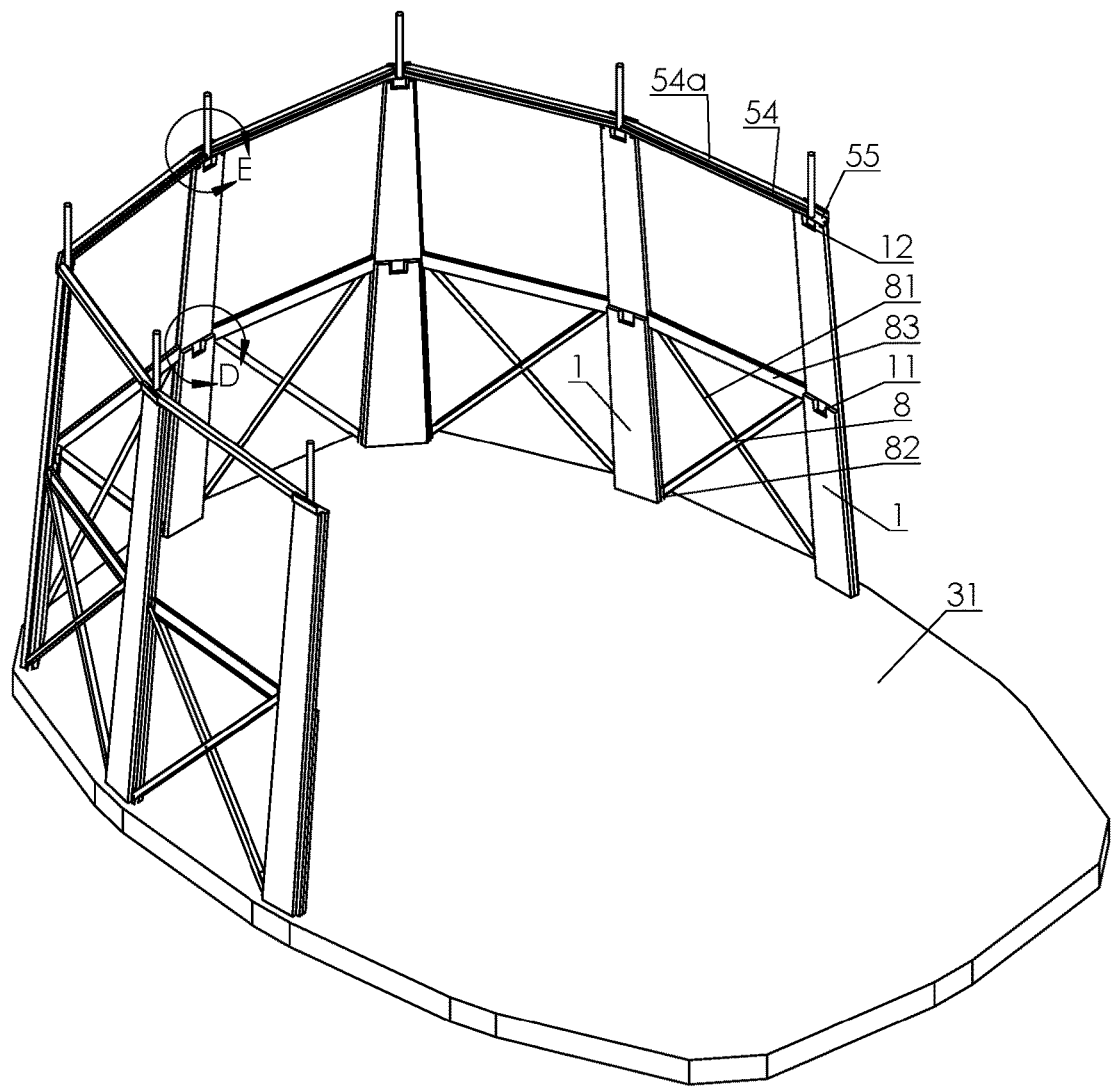
FIG. 19 is an isometric view of a partial assembly of the columns using spreader inserts.

Referring to FIG. 19. An isometric view of the partial assembly of the house in irregular shape shows floor slab 31 symmetrical in both planar axes with a multitude of columns 1 separated by spreader inserts 8 that are used during the assembly of the house featuring alternatives for concrete walls. Every two spreader inserts 8 provide lateral support for one column 1. Adjustable base 81, equipped with shiplap clamps 82 on both sides, carries a load of lateral force resulting from the gravity of columns 1 leaning towards the centroid of the structure and also, in a later stage of installation, the live load of the floor and roof slabs until replaced by the final type of walls. Adjustable base 81 secures space between columns 1 for the placement of the walls in the final assembly of the house while keeping columns in position to ensure temporary balance of the structure. Cross beams 83 aligned with the inside edges of the columns substitute and act like the inner faces of concrete walls when casting the second-floor concrete slab. The bracket with banister column 55 establishes the placement of peripheral beams 54, of which the outer part functions as the roof peripheral curb 54a. Using a mid-size forklift instead of a crane is adequate during the erection process to move and lift consecutive columns from flat to tilted positions and walls in provided spaces in the final assembly.

Figure 20:
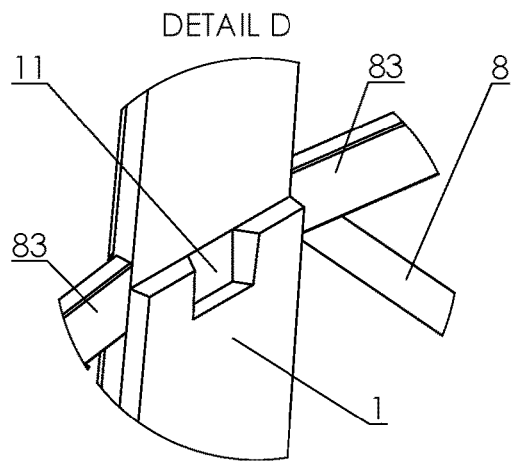
FIG. 20 shows detail D of the column 2nd-floor ledge and spreader insert assembly.

Referring to FIG. 20. Detail D shows the location and placement of the spreader insert 8 and cross beams 83 that allow casting the concrete floor slab over the structural assembly of the second floor supported on ledge 11 of column 1, and while removed in the final stage of house assembly secure the space necessary to fit the prefabricated walls. The second-floor slab 4 from FIGS. 14 and 15, placed fixedly on the ledge 11 of columns 1 together with the spreader inserts 8, keep the assembly of the columns in equilibrium if the polygonal house is symmetrical in both planar axes. In such a construed house, the forces acting on one side of the structure are balanced by the counteracting forces of the opposite side.

Figure 21:
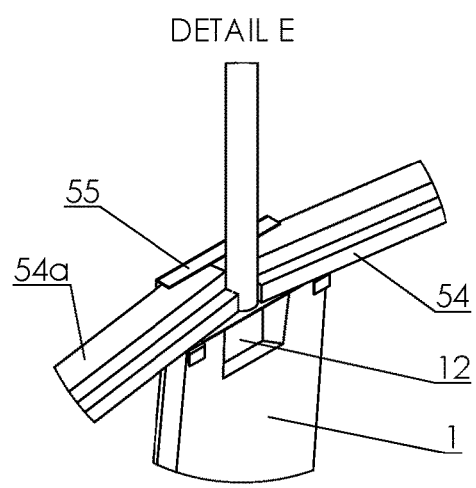
FIG. 21 is a view of detail E of the top column with the roof ledge and roof peripheral beams assembly.

Referring to FIG. 21. Detail E shows the location and placement of the bracket with banister column 55 securing the position of roof peripheral beams 54 that accommodate casting of the concrete roof slab 5 from FIGS. 14 and 15 supported on ledge 12 of columns 1. The outer part of the peripheral beams 54 is the roof peripheral curb 54a of the cast roof slab 5 that connects the tops of columns in the structure and adds weight and enough rigidity to the assembled structure of columns 1 to remain in temporary equilibrity even after removing the spreader inserts 8.

Figure 22:
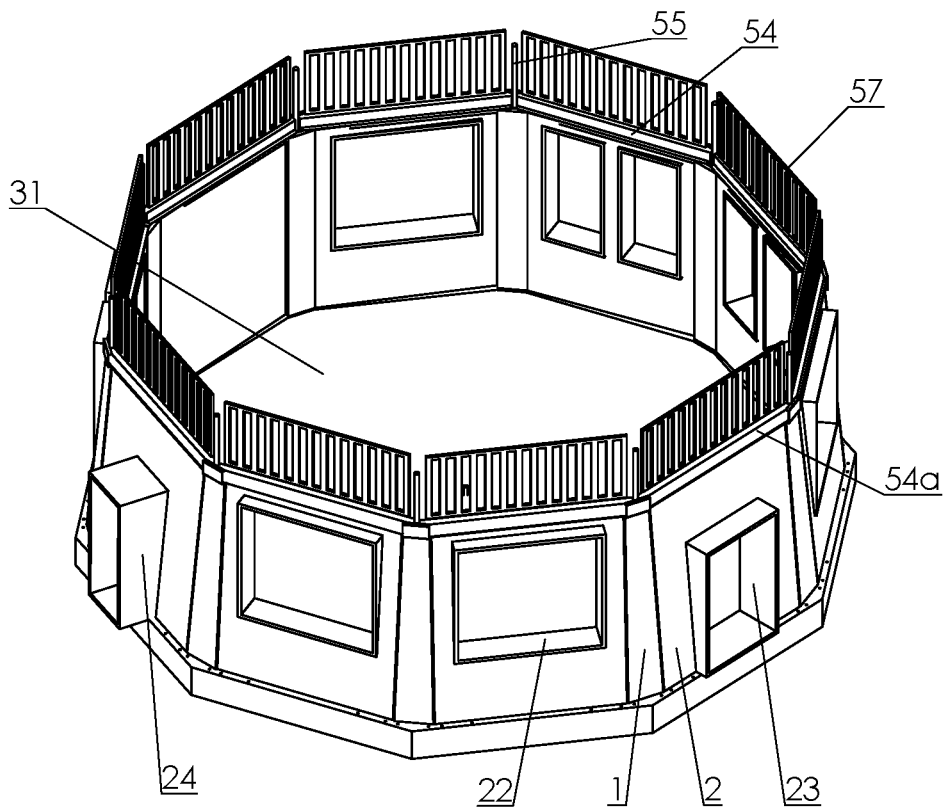
FIG. 22 is an isometric view of a one-story house in a regular decagonal shape assembly without a roof slab.

Referring to FIG. 22. The isometric view of the one-story house assembly in a regular decagonal shape on floor slab 31 without a roof slab illustrates the construction of the house in the shape of a pyramid frustum. Wall 2 has openings filled with window box frames 22, allowing the installation of windows. Door box frame 23 allows the installation of the entrance door, and box frame 24 works as the passage between the house and the garage. The brackets crown each column 1 with a banister column 55, securing the installation of roof peripheral banisters 57 placed for the safety of the tenants while on the roof and increasing the house's appearance. The roof peripheral beams 54 work as roof peripheral curbs 54a after the roof slab is cast. The shape and size of all columns 1 are identical, and each column top facilitates the size of the required ledge for the i-beam structure. The structure provides an open living space inside the house that may be customized, as shown in FIG. 17.

Figure 23:
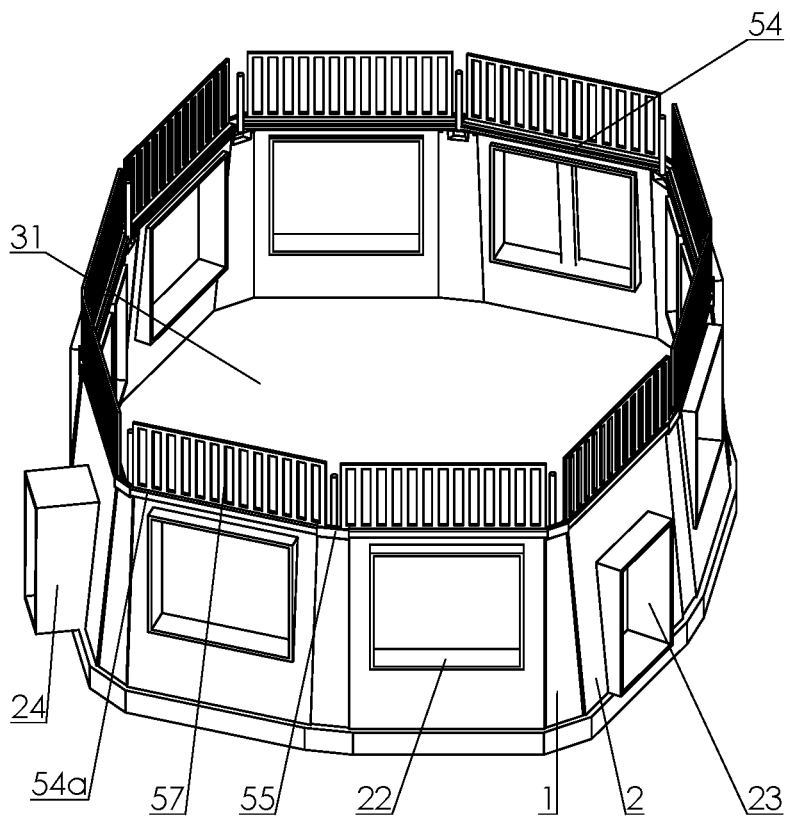
FIG. 23 is an isometric view of a one-story house in an irregular decagonal shape assembly without a roof slab.

Referring to FIG. 23. The isometric view of the one-story house assembly in an irregular decagonal shape without a roof slab on floor slab 31 illustrates the construction of the house in the shape of a pyramid frustum. Walls 2 and all structure elements, except columns 1, are identical to those illustrated in FIG. 22. The squarish shape of the irregular decagonal house is achieved by using differently dimensioned columns 1 placed in a pattern, symmetrical in both planar axes, between dimensionally identical walls 2. Each column 1 has a different size of the bottom faces subjected to the polygon geometry illustrated in FIG. 6 of this disclosure. The sizes of all top faces have to facilitate the size of the ledge required for the structure. The house in irregular polygonal shape features the same size and quantity of walls as the regular polygonal shape from FIG. 22, ending with a smaller living space in an irregular shape but providing better functionality and space utilization than in a regular shape.

Figure 24:
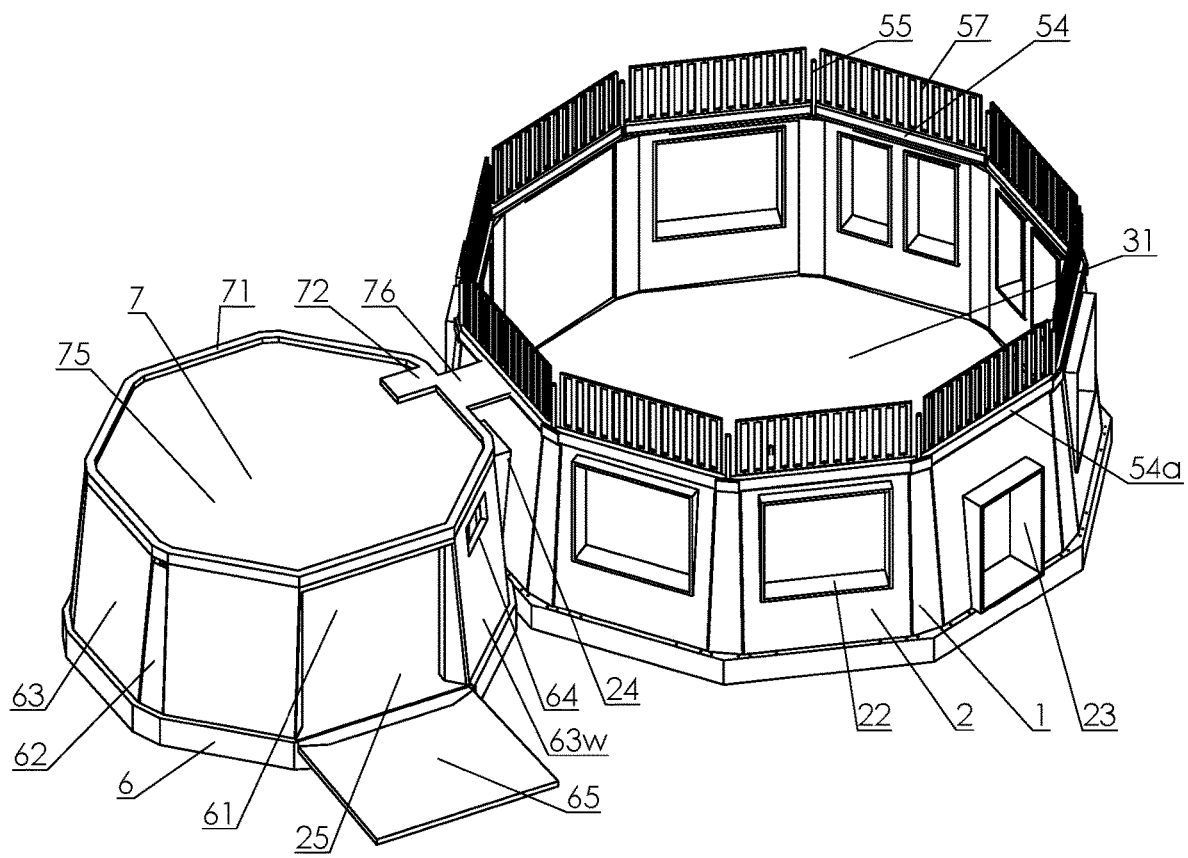
FIG. 24 is an isometric view of an exemplary house and garage assembly, both in regular polygonal shapes.

Referring to FIG. 24. Showing the isometric view of the one-story house-garage assembly of the house in regular decagonal shape from FIG. 22 and garage in regular octagonal shape with all identical columns 62 in isosceles trapezoidal shape and equal size rectangular walls 63, all placed on floor slab 61. Both structures are connected by the house-garage passage 24. Garage wall 63w has window opening 64. The garage roof slab 7 with the peripheral curb 71 has covered roof ingress 72. The garage foundation 6 incorporates a garage driveway 65 in front of the garage door opening 25. The garage roof slab may be used as a cultivation space 75. The roof of the one-story house is accessible from the garage roof by the safe garage roof passage 76 when provided.

Figure 25:
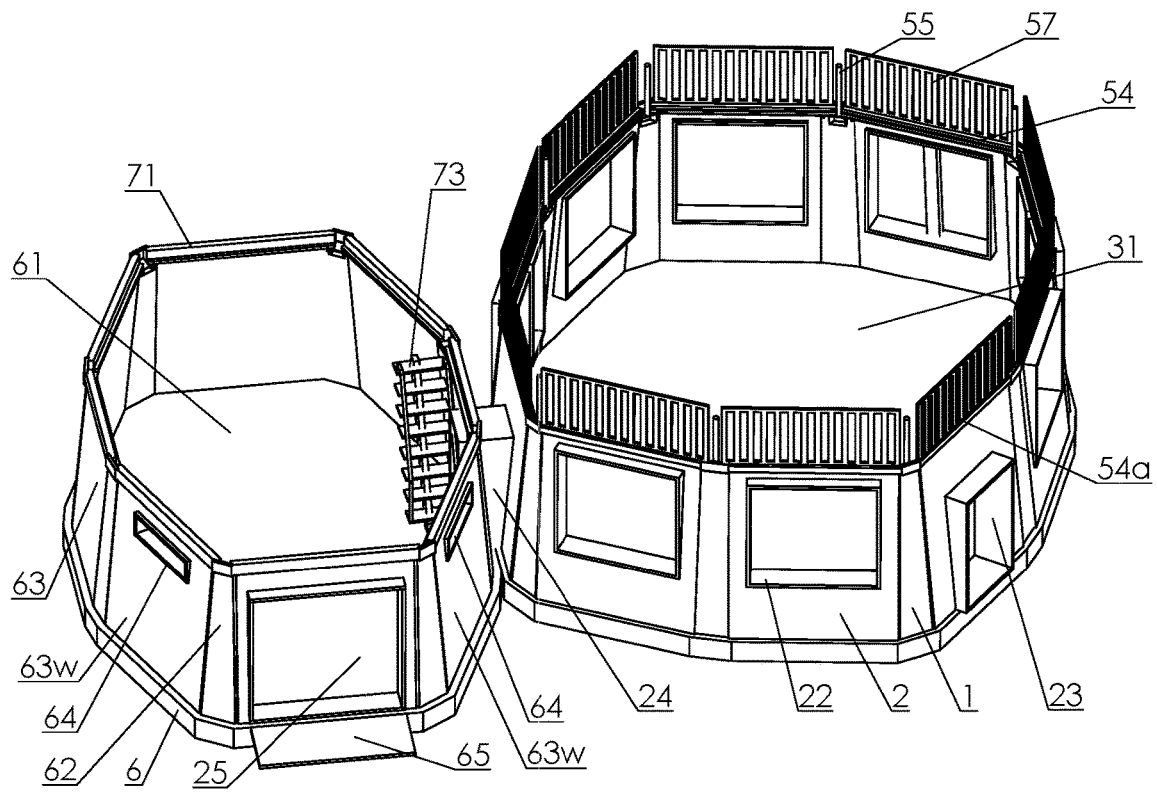
FIG. 25 is an isometric view of an exemplary house and garage assembly, both in irregular polygonal shapes.

Referring to FIG. 25. The house-garage assembly is shown in an isometric view of the house in an irregular decagonal shape from FIG. 23 and the garage in irregular octagonal shape from FIG. 13 connected by the house-garage passage 24. The garage assembled on floor slab 61 has columns 62 in an isosceles trapezoidal shape with differently dimensioned columns 1 and equal-sized rectangular walls 63. The roof of the structure is surrounded by the peripheral curb 71. The inner staircase 73 is located close by the house garage passage 24 and the safe passage 76, similar to the one shown in FIG. 24 from the garage roof to the second floor of the house if provided. The garage walls 63w have a window opening 64. The foundation of garage 6 has a garage driveway 65 in front of the garage door opening 25.

Figure 26:
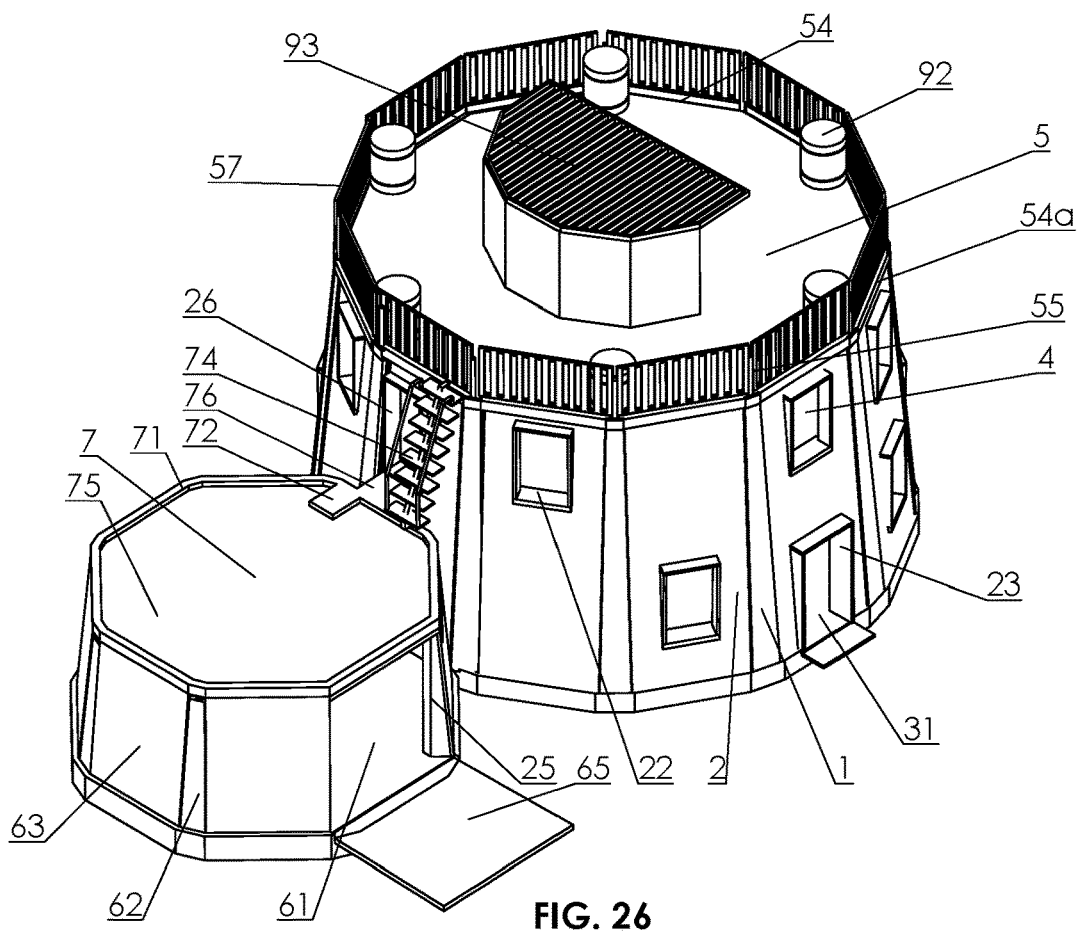
FIG. 26 is an isometric view of a completed two-story house with roof equipment and a garage with a passage from the garage roof to the second floor and the roof of the house.

Referring to FIG. 26. A Two-story house structure in a regular dodecagonal shape has attached a garage in a regular octagonal shape. The house, consisting of twelve identical columns 1 in an isosceles trapezoidal shape, is set on the regular dodecagonal floor slab 31. The garage consists of six identical columns 62 in an isosceles trapezoidal shape and seven walls 63 in rectangular shape are set on the regular dodecagonal floor slab 61 with garage driveway 65 together with two columns of the garage opening 25 that accept installation of the garage door of choice. Both house and garage structures can be erected using spreader inserts 8 from FIG. 19 allowing walls 2 of the house and 63 of the garage to be made from material other than cement. The house walls, regardless of the material the walls are made of, have various openings for windows 22, entrance door 23, and garage-house second-floor passage door 26. The house's roof in every embodiment contains a multitude of water barrels 92 fixedly placed on the roof and work as drinking water storage. The height of the roof peripheral curb 54a, part of the roof peripheral beam 54, defines the amount of desired accumulation of rainwater on the roof. Pergola structure 93, in a polygonal shape placed in the center of the roof, provides shade for the picnic area on the roof and for safe storage of picnic equipment. The pergola walls function as a base for installing foldable solar panels. The roof peripheral banisters 57 placed between brackets with banister column 55 ensure the safety of the roof space for tenants and, together with pergola structure 93, also improve the house's appearance. Garage roof slab 7 with peripheral curb 71, when covered with a layer of soil, can serve as cultivation space 75 of the garage. If necessary, solar panels installed on the roof on adjustable frames also provide shade for plants. Garage roof ingress 72 leads from the first floor of house 31 through garage inner staircase 73 to the garage roof 7. Safe passage 76 provides communication from the garage roof to the second floor of the house. The garage roof staircase 74 leads to the house roof 5 when inner communication between second floor 4 and the house roof 5 is not otherwise provided through the internal staircase. Use of outside communication between floors frees the first and second floors from the space taken by staircases and as such extending the living space inside the house.

The house's structure, erected in the way disclosed in FIG. 26, is safe in case of an earthquake. The lateral movement of the structure has to produce a critical destructive force on the columns, exceeding their resilience to disintegration under applied compression of the neighboring walls. In the structure assembled with concrete columns and walls, which together form a rigid shell, such damage is unlikely to occur as compressing force is distributed along the whole length of side edges of each column and wall in the unified structure. Also, the amplitude of the tremor has to exceed the tilt distance projection of the wall top on the floor to overcome the inertia of the walls and columns placed between the walls. Introducing adhesive sealant between columns and walls provides an adequate kind of fastening to prevent such occurrences in an earthquake. The assembled house and garage, both in regular or irregular polygonal shapes of pyramid frustum, illustrate that no wall is encountering full strength of wind sheer force, and every wall is capable of deflecting wind without creating the possibility of lifting or collapsing.

Figure 27:
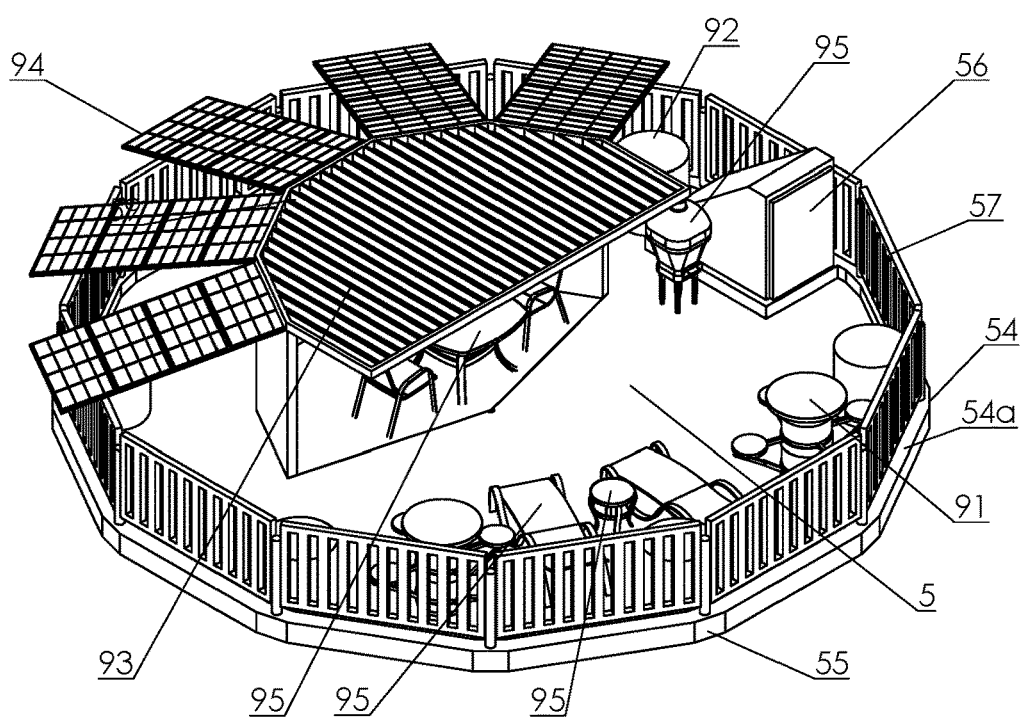
FIG. 27 is an isometric view of a self-sufficient roof of the house with an inner passage from the second floor to the roof.

Referring to FIG. 27. Finished and furnished exemplary roof of the house in dodecagonal regular polygon from FIG. 26 has covered roof ingress 56 for the inner staircase leading from the second floor to the roof. To the permanent roof elements from FIG. 26, various elements are added to make the house function in remote areas as a self-sufficient structure. The pieces of picnic equipment 95 are safely stored during a hurricane inside the pergola structure 93. Picnic table-barrels 91 containing rainwater feature also folded seats. Solar panels 94 of the modular type mounted on pergola walls, when folded, form the partial pyramid frustum shape protecting itself and the rooftop. A dining set with a BBQ unit in the shadow of the pergola ensures comfortable conditions for picnics on sunny days.

The rectangular walls 2, made as concrete casts, are the heaviest and widest elements of the structure that have to be delivered to the site on public roads and have to comply with regulations of wide-load transportation. A Mid-size forklift placed for installation on the floor slab of the house or garage is sufficient for loading and off-loading such elements. Installation of the walls on site consists of moving each panel close to the location on the concrete floor and lifting only one end of the panel during the erecting process. The same procedure applies to erecting trapezoidal columns. The preferred method of installation of the pyramidal frustum house and garage eliminates the Use of a heavy crane on site, significantly reducing the cost of erecting.

What is claimed is:

1. A house structure comprising: a concrete foundation with a concrete floor slab having a polygonal shape symmetrical about both horizontal planar axes; a plurality of peripheral bracket assemblies embedded in said foundation and placed at a plurality of tilted walls and columns; six or more even number of the plurality of walls each having a rectangular shape of equal size with rabbeted side edges and top and bottom faces parallel to the floor slab, each said wall leaning at a tilted angle of between four and eight degrees towards the centroid of the foundation; six or more even number of the plurality of columns of equal size in each having an isosceles trapezoid shape with rabbeted side edges matching the rabbeted side edges of the walls, having top and bottom faces parallel to the floor slab and leaning towards the centroid of the foundation; said trapezoidal columns placed in spaces between the rectangular walls so as to form a pattern symmetrical to both said horizontal planar axes, whereby outside angles between the side edge of each of the columns and the side edge of each of the walls at all of the matching rabbeted side edges, are either acute equal outside angles or acute varying outside angles; the trapezoidal columns having top ledges for a roof, or for two-story structures having intermediate ledges for a second floor; and whereby the house structure is held together along the rabbeted side edges by lateral forces resulting from the weight of the tilted walls and columns leaning towards the centroid of the structure, has a regular polygonal pyramid frustum shape having the acute equal outside angles or an irregular polygonal pyramid frustum shape, and is designed to resist tornadoes.

2. The house structure of claim 1, wherein having the acute varying outside angles results in the irregular polygonal pyramid frustum shape of the house structure.

3. The house structure of claim 1, comprising: the roof comprised of a flat concrete roof slab supported on the column top ledges; an intermediate concrete floor slab supported on the column intermediate ledge; whereby the house structure in both h regular and the irregular polygonal pyramid frustum shapes, is capable of functioning as a garage, a one-story house, or a two-story house.

4. The rectangular walls of claim 1, comprising: multiple openings in the walls for doors or windows; box frames having rectangular plates including horizontal top, horizontal bottom, and two vertical plates, of the same widths that depend on the tilted angle of the walls, the box frames placed in each said opening wherein the horizontal top and bottom plates are parallel to the floor, one as a header and the other as a sill, and are spaced by the two vertical plates as jambs, all four plates together lining each said opening; whereby the box frames ensure vertical placements of the doors and windows in the tilted walls and protect against debris.

5. The walls of the house structure of claim 1, comprising: vertical wall liners placed inside the house structure, each enclosing window and door box frames of the corresponding tilted wall, wherein a space between an outside of the tilted walls and the vertical wall liners provides thermal and sound insulation, and a utility space for internal installations.

6. The house structure of claim 1, wherein the roof comprises a flat concrete roof slab with a peripheral curb, a set of interconnected water barrels around the perimeter of the roof, a polygonal pergola structure placed on the roof having walls functioning as a base for an installation of solar panels, an outside or inside access to the roof, a roof peripheral banister, and whereby the roof is capable of retaining and storing rainwater and functioning as a picnic area.

* * * * *